United States Patent Office 3,231,488
Patented Jan. 25, 1966

3,231,488
PROCESS FOR HYDROREFINING HEAVY HYDRO-
CARBON CHARGE STOCKS AND CATALYST
THEREFOR
John G. Gatsis, Des Plaines, and William K. T. Gleim,
Island Lake, Ill., assignors to Universal Oil Products
Company, Des Plaines, Ill., a corporation of Delaware
No Drawing. Filed Oct. 28, 1963, Ser. No. 319,581
10 Claims. (Cl. 208—264)

The present application is a continuation-in-part of our copending application, Serial Number 207,071, filed July 2, 1962, now Patent No. 3,161,585, December 15, 1964, the teachings of which copending application are incorporated herein by specific reference thereto. The present invention encompasses a process for hydrorefining the heavy hydrocarbon fractions generally derived from various petroleum crude oils. More specifically, the present invention is directed toward the preparation of a novel catalytic composite and the utilization thereof in a process for hydrorefining a variety of hydrocarbon fractions and/or distillates excessively contaminated through the presence of large quantities of sulfurous compounds, nitrogenous compounds and various metallic contaminants.

In copending application Serial Number 207,071, we have described a slurry-type process utilizing a catalyst which is colloidally dispersed within the hydrocarbon charge stock being subjected to hydrorefining reactions for the purpose of the destructive removal of nitrogenous and sulfurous compounds, and various organo-metallic contaminants. As stated therein, the catalytic material, upon admixture with the petroleum hydrocarbon charge stock, contacts the asphaltenes therein and forms a complex therewith. The presence of asphaltenes within the hydrocarbon charge stock was said to be essential to maintain the catalytic material as a colloidal dispersion or suspension while processing such charge stock at the necessary hydrorefining conditions. When attempting to form a colloidal dispersion or suspension with a hydrocarbon charge stock substantially free from pentane-insoluble asphaltenes, that is, containing less than about 0.1% by weight thereof, the catalyst particles have the tendency to settle virtually immediately, and are rather easily removed from the hydrocarbon fraction by centrifugal separation. The present invention, therefore, is directed toward a particular method which enables the formation of the colloidal dispersion while processing a hydrocarbon charge stock originally substantially free from asphaltenes.

Crude petroleum oils, as well as many of the heavier hydrocarbon fractions and/or distillates derived therefrom, generally contain metallic contaminants having an adverse effect on catalyst utilized in various processes to which the crude oil or heavy hydrocarbon fraction may be subjected. The most common metallic contaminants are nickel and vanadium, although other metals including iron, copper, etc., are often present in detrimental quantities. These metals may exist within the hydrocarbon fraction in a variety of forms: they may exist as metal oxides or sulfides, introduced into the crude oil as metallic scale or similar particles, or they may be present in the form of soluble salts of such metals. Usually, however, they exist in the form of stable organo-metallic compounds such as metal porphyrins and the various derivatives thereof. Although the metallic contaminants existing as oxide or sulfide scale may be removed, at least in part, by a relatively simple filtering technique, and the water-soluble salts are at least in part removable by washing and subsequent dehydration, a much more severe treatment is required to remove the organo-metallic compounds before the crude oil is rendered suitable for further processing. Notwithstanding that the concentration of these organo-metallic compounds is relatively small, often less than about 10 p.p.m., calculated as the elemental metal, subsequent processing techniques will be adversely affected thereby. For example, when a hydrocarbon charge stock containing metallic contaminants in excess of about 3.0 p.p.m., as elemental metals, is subjected to various catalytically-conducted processes, the metals become deposited upon the catalyst, with the result that the composition thereof is altered to the extent that undesirable by-products are formed. That is to say, the composition of the catalyst, which is closely controlled with respect to the nature of the charge stock and the quality and quantity of the product desired, is changed considerably as a result of the deposition of the metals during the course of the process. In addition, petroleum crude oil and the heavier hydrocarbon fractions derived therefrom, generally contain undesirable nitrogenous and sulfurous compounds in detrimentally excessive quantities. For example, a Wyoming sour crude having a gravity of 23.2° API at 60° F., contains about 2.8% by weight of sulfur and about 2700 p.p.m. of total nitrogen, computed as the elements. The nitrogenous and sulfurous compounds are at least in part removable through the use of various treating processes wherein such compounds are converted to hydrocarbons, ammonia and hydrogen sulfide. However, a reduction in the concentration of the stable organo-metallic compounds, and to the extent that the crude oil becomes suitable for further processing, is not as readily achieved.

In addition to the foregoing described contaminating influences, most crude oils and heavier hydrocarbon fractions contain considerable quantities of pentane-insoluble materials, described as asphaltenes, which act as coke-precursors having the tendency to become immediately deposited within the reaction zone and onto the catalytic composite in the form of a gummy hydrocarbonaceous residue. However, not all heavy hydrocarbon fractions and/or distillates, severely contaminated by excessive quantities of sulfurous and nitrogenous compounds, as well as organo-metallic compounds, contain pentane-insoluble asphaltenic material. For example, various catalytic cracking recycle stocks, light and heavy gas oils, cycle stocks, visbreaker product effluent, etc., often are substantially completely free from pentane-insoluble asphaltenic material, containing less than about 0.1% by weight thereof. It is difficult to effect an acceptable degree of decontamination of such charge stocks, through the utilization of a slurry-type process in which the catalytic agent is dispersed within the charge material as a colloidal suspension. On admixture with a petroleum hydrocarbon fraction containing pentane-insoluble asphaltenes, the catalytic agent contacts the asphaltenes to form a complex therewith, becoming colloidally dispersed within the hydrocarbon fraction. It is believed that the presence of the asphaltenic material is necessary in order to maintain the catalytic agent as a colloidal dispersion or suspension in the manner contemplated by the slurry process. As hereinafter set forth, the colloidally dispersed catalyst is significantly less effective in achieving decontamination of a hydrocarbon fraction where such fraction does not contain asphaltenic material.

An object of the present invention is to provide a process for hydrorefining, or decontaminating, heavy hydrocarbon fractions and/or distillates which are substantially free from pentane-insoluble asphaltenic material. Therefore, in a broad embodiment, the present invention relates to a process for hydrorefining a hydrocarbon charge stock substantially free from pentane-insoluble asphaltenes, which process comprises forming a complex of an asphaltene and at least one metallic component selected from the metals of Groups V–B, VI–B and the Iron-group of the Periodic Table, admixing said complex with said charge stock and reacting the resulting colloidal suspension with hydrogen at hydrorefining conditions.

In another broad embodiment, the present invention provides a process for hydrorefining a hydrocarbon charge stock containing less than about 0.1% by weight of pentane-insoluble asphaltenes, which process comprises forming a complex of an asphaltene and at least one organo-metallic compound selected from the metals of Groups V–B, VI–B and the Iron-group of the Periodic Table, admixing said complex with said charge stock and reacting the resulting colloidal suspension with hydrogen at a temperature above about 225° C. and under a pressure greater than 500 pounds per square inch gauge.

More specifically, the present invention involves a process for hydrorefining a hydrocarbon charge stock containing less than about 0.1% by weight of pentane-insoluble asphaltenes, which process comprises admixing phosphomolybdic acid with an asphaltene, heating the mixture at a temperature less than about 310° C., for a time sufficient to decompose said phosphomolybdic acid and to form a complex with said asphaltene, admixing said complex with said charge stock to form a colloidal suspension, and reacting said colloidal suspension with hydrogen at a temperature of from about 225° C. to about 500° C. and under a pressure of from about 500 to about 5000 pounds per square inch gauge.

From the foregoing embodiments, it will be noted that the present invention teaches the utilization of a colloidally dispersed, unsupported catalyst particularly adapted to a slurry-type process. Slurry processes employing catalytically active metals deposited upon refractory inorganic oxide material, such as alumina and/or silica, are very erosive and cause plant maintenance to be difficult and expensive. Through the use of a colloidally dispersed catalytic agent, in accordance with the present invention, extensive erosion and/or corrosion of the reaction system is virtually eliminated. The catalytic agent, preferably an organo-metallic compound selected from the metals of Groups V–B, VI–B and VIII of the Periodic Table (Handbook of Physics and Chemistry, 43rd edition) is initially combined with an asphaltene, forming a complex therewith upon being decomposed at a temperature less than about 310° C. This asphaltenic complex is then admixed with the substantially asphaltene-free charging stock, to form the colloidal dispersion or suspension. Thus, the catalytic agent may be colloidally dispersed component of vanadium, niobium, tantalum, molybdenum, tungsten, iron, cobalt, nickel, mixtures of two or more, etc. Suitable organo-metallic compounds for utilization in forming the asphaltenic complex include heteropoly acids such as phosphomolybdic acid, silicotungstic acid, phosphovanadic acid, molybdenum blue, various carbonyls including molybdenum hexacarbonyl, vanadium hexacarbonyl, nickel carbonyl, cobalt hexacarbonyl, beta diketones including vanadium acetylacetonate, tungsten acetylacetonate, nickel acetylacetonate, molybdenum ethylenthate, vanadium ethylanthate, organo-metallic sulfides of the foregoing metals, etc. It is also contemplated that the catalytic agent may be a combination of any two or more of the aforesaid metals, such as molybdenum and vanadium, vanadium and nickel, molybdenum and iron, etc.

The colloidal dispersion of catalytic agent and hydrocarbon charge stock may be prepared by any conventional and/or otherwise suitable convenient method. One method consists of the thermal decomposition of the organo-metallic compound with the asphaltene, followed by admixing the resulting asphaltenic complex with the crude oil to be processed. A preferred method comprises dissolving the asphaltene in a solvent which is distillable at a temperature below about 310° C., such as benzene, admixing the organo-metallic compound, such as phosphomolybdic acid, therewith and removing the solvent by distillation means at a temperature below about 310° C. The resulting complex is then intimately admixed with the hydrocarbon charge stock. On the other hand, the solvent need not be removed until the mixture of the organo-metallic compound and the asphaltene is added to the crude oil or other hydrocarbon fractions, the removal of the solvent taking place as the mixture is being heated to the desired reaction conditions. The colloidal suspension comprises from about 0.1% to about 10.0% by weight of the foregoing metals, calculated on the basis of the elements.

The colloidal dispersion is reacted with hydrogen at a temperature above about 225° C., and preferably from about 225° C. to about 500° C., and at a hydrogen pressure in excess of about 500 pounds per square inch gauge, having an upper limit of about 500 pounds per square inch gauge. The effectiveness of the catalytic agent is significantlly improved in the presence of from 1.0 to 15.0 volume percent of hydrogen sulfide added to the hydrogen atmosphere prior to initiating the reactions. As the hydrorefining reactions proceed, a catalyst-containing sludge is formed; this sludge, containing the added asphaltenes, catalyst and the various metallic contaminants, may be readily separated from the hydrorefined normally liquid product effluent by any suitable means including settling tanks, centrifugal separation, etc.

The process of the present invention may be effected in any suitable manner, and may consist of either a batch or a continuous operation. For example, when a batch-type of operation is employed, the colloidal suspension is placed in a suitable reaction vessel, such as a high pressure autoclave, and sealed therein. The autoclave is charged with hydrogen to the desired pressure and the vessel contents are heated to the desired temperature level. The hydrorefined, normally liquid product effluent, is recovered from the reaction mixture by any suitable means, the resulting catalyst-containing sludge being recovered for subsequent re-use with the fresh hydrocarbon charge stock. The ammonia and hydrogen sulfide, resulting from the conversion of nitrogenous and sulfurous compounds, may be removed in a gaseous phase along with any light paraffinic hydrocarbons including methane, ethane, propane, and the like.

A continuous type of operation is preferred wherein the starting materials, hydrogen and the colloidal suspension, are continuously charged to a suitable high-pressure reactor maintained at the proper conditions of temperature and pressure. The reaction mixture is continuously withdrawn from the reactor at a rate which will insure an adequate residence time therein. The hydrorefined product may again be recovered from the catalyst-containing sludge by means of a centrifuge or settling tanks, and the catalyst sludge recycled as a portion of the charge to the aforesaid reactor. The catalyst-containing sludge consists of certain metals, separated from the hydrocarbon charge by means of the hydrorefining process, which metals are suitable for use as colloidally dispersed catalytic agents in accordance with the present invention. Thus, the recycled sludge is supplemented with catalytic material such that in most cases only small amounts of make-up catalyst will be required, and in many cases the catalyst can be substantially self-sustaining.

The following examples are presented in further illustration of the process of the present invention, and to indicate the advantages to be derived therefrom with respect to the removal of metallic contaminants and the conversion of nitrogenous and sulfurous compounds to nitrogen-free and sulfur-free hydrocarbons. It is not intended that the examples be construed as a limitation on the generally broad scope of this invention.

The hydrocarbonaceous material utilized as the charge stock in the following examples was a Wyoming sour crude oil having a gravity, ° API at 60° F., of about 23.2.

This petroleum crude oil is contaminated by the presence of 2700 p.p.m. of nitrogenous compounds (computed as elemental nitrogen), 2.8% by weight of sulfurous compounds (calculated as elemental sulfur), approximately 18 p.p.m. of organo-nickel compounds and about 81 p.p.m. of organovanadium compounds (calculated as if the metals were present in the elemental state). In addition to these contaminating influences, the crude oil consisted of about 8.3% by weight of asphaltenes.

Reference is also made in the following examples, to a white oil; this is a hydrocarbon fraction virtually completely devoid of organo-nickel and organo-vanadium compounds, and contains less than 0.1% by weight of asphaltic compounds. The white oil has a gravity, ° API at 60° F., of 28.4 and an initial boiling point of 690° F. (the 90.0% volumetric distillation point is 862° F.). As hereinafter set forth, this white oil was used to show the need for asphaltenic compounds with which the metallic component, in the form of an organometallic compound, forms a colloidally dispersed complex.

EXAMPLE I

Phosphomolybdic acid, in an amount of 12.7 grams was dissolved in 150 grams of isopropyl alcohol. The resulting solution was added dropwise to 500 grams of the white oil, accompanied by vigorous stirring with a vibromixer, and removal of the alcoholic solvent by distillation. As the solution of phosphomolybdic acid was added to the white oil, the resulting mixture developed an opaque blue color; furthermore, the catalyst particles began settling virtually immediately, and were easily separated completely from the white oil by centrifugal means. Calculations indicated that 513 grams of the white oil-phosphomolybdic acid mixture originally consisted of 1.24% by weight of molybdenum, as if existing as the elemental metal, and that substantially all of the molybdenum appeared in the solid material which immediately settled from the white oil.

Phosphomolybdic acid, in an amount of 25.4 grams, was dissolved in 300 grams of isopropyl alcohol, the resulting solution being added dropwise to 1000 grams of the sour Wyoming crude oil accompanied by removal of the alcoholic solvent and intimate mixing with the vibromixer. An analysis of the resulting colloidal dispersion indicated a concentration of 1.46% by weight of molybdenum, calculated as the elemental metal. There was no indication of a settling of solid material from the mixture.

214 grams of the crude oil-phosphomolybdic acid dispersion were subjected to centrifugal separation for 30 minutes on an angle centrifuge at 3500 r.p.m. The supernatant liquid was decanted from the centrifuged solids, the latter being treated with benzene to remove the benzene-soluble portion, than pentane-washed to remove the pentane-soluble portion. A total of 2.0 grams of insoluble solids remained, indicating that the significantly greater proportion of the molybdenum, in the form of the asphaltenic complex, remained as a highly dispersed material within the crude oil. This is in direct contrast to the removal of the molybdenum component, by virtue of immediate settling, from the white oil in which no asphaltenes were originally present.

EXAMPLE II

The above-described sour Wyoming crude oil was prepared in admixture with a colloidally dispersed molybdenum component by heating a mixture of about 200 grams of said crude oil and about 23 grams of molybdenum hexacarbonyl at a temperature of about 250° C. for a period of about 3 hours. Carbon monoxide, resulting from the decomposition of the hexacarbonyl, was separated from the mixture which was thereafter sealed in an 850 cc. autoclave and pressured to 100 atmospheres with hydrogen. The autoclave contents were stirred at a temperature of about 400° C. for a period of about 8 hours, the resulting final pressure being about 200 atmospheres. The hydrorefined product, consisting of the normally liquid hydrocarbons, was separated from the catalyst sludge and found to contain about 0.10% by weight of pentane-insoluble asphaltenes, less than about 0.02 p.p.m. of nickel, less than about 0.02 p.p.m. of vanadium, and about 0.2% by weight of sulfur, and only 7.1 p.p.m. of nitrogen.

EXAMPLE III

A mixture of the Wyoming sour crude and colloidally dispersed vanadium component was prepared by adding a solution of about 42 grams of vanadyl acetylacetonate in 500 grams of n-amyl alcohol dropwise to about 250 grams of the sour crude which was stirred at a temperature of about 160–165° C. The alcohol solvent was recovered in an overhead condenser. Thereafter, hydrogen sulfide was bubbled through the stirred mixture at a temperature of about 180° C. 100 grams of the mixture was then sealed in the 850 cc. autoclave and the autoclave pressured to 100 atmospheres with hydrogen. The autoclave contents were stirred at a temperature of about 400° C. for a period of about 8 hours, the resulting final pressure being 200 atmospheres. The hydrorefined product, consisting of normally liquid hydrocarbons, was separated from the catalyst sludge and found to contain about 0.308% by weight of pentane-insoluble asphaltenes, less than about 0.03 p.p.m. of nickel, less than about 0.6 p.p.m. of vanadium, 139 p.p.m. of nitrogen, and 0.19% by weight of sulfur.

EXAMPLE IV

A mixture of the Wyoming sour crude and a colloidally dispersed molybdenum component was prepared by adding a solution of about 6.34 grams of phosphomolybdic acid in 100 grams of isoamyl alcohol dropwise to about 250 grams of the sour crude, the isoamyl alcohol being immediately distilled therefrom. This mixture was thereafter sealed in an 850 cc. autoclave and was pressured to about 100 atmospheres with hydrogen. The autoclave contents were stirred at a temperature of about 400° C. for a period of about 8 hours, the final pressure being about 200 atmospheres. The hydrorefined product, consisting of normally liquid hydrocarbons, was separated from the catalyst sludge and found to contain about 0.318% by weight of pentane-insoluble asphaltenes, less than about 0.06 p.p.m. of nickel, less than about 0.07 p.p.m. of vanadium, 112 p.p.m. of nitrogen, and 0.09% by weight of sulfur.

EXAMPLE V

The pentane-insoluble asphaltene fraction is removed from 500 grams of the Wyoming crude oil by treating the same with pentane and employing centrifugal separation to recover about 41.5 grams of pentane-insoluble asphaltenes. Both the supernatant liquid (458.5 grams) and the centrifuged solids are divided into substantially equal portions, one of the liquid portions being combined with about 6.34 grams of phosphomolybdic acid and 100 grams of isoamyl alcohol as in Example IV above. Notwithstanding an almost immediate settling of the dispersed material, the mixture is placed in the 850 cc. autoclave for 8 hours at a temperature of 400° C. and under a pressure of 200 atmospheres. Although there is a minor degree of decontamination effected, due mainly to cracking-type reactions, the crude oil must necessarily be subjected to additional further treatment to reduce the concentration of nitrogenous and sulfurous compounds, as well as the quantity of organo-vanadium and organo-nickel compounds.

A portion (20.75 grams) of the pentane-insoluble centrifuged solids is dissolved in benzene, and admixed with about 6.34 grams of phosphomolybdic acid. The resulting mixture is added dropwise to the second half of the asphaltene-free supernatant liquid, with the benzene being immediately distilled from the mixture. The colloidal dispersion which is formed is placed in the autoclave and heated for 8 hours at a temperature of 400° C. and under a hydrogen pressure of 200 atmospheres. Following the cooling and depressuring of the autoclave, the normally liquid hydrocarbon portion of the product effluent is separated from the catalyst-containing sludge, and analyzed to determine the degree of decontamination. The results are found to be comparable to those of Examples II, III and IV, in that there is a significant reduction in sulfurous and nitrogenous compounds, and particularly in the elimination of the organo-metallic contaminants.

The foregoing examples and specification illustrate the method by which the process of the present invention is effected and indicates the benefits afforded through the utilization thereof.

We claim as our invention:

1. A process for hydrorefining a hydrocarbon charge stock containing less than about 0.1% by weight of pentane-insoluble asphaltenes which comprises admixing with an asphaltene at least one organo-metallic compound selected from the group consisting of a carbonyl, a beta-diketone complex and a heteropoly acid, said compound containing a metal selected from the metals of Groups V–B, VI–B and the Iron-group of the Periodic Table, heating the resultant mixture at below about 310° C. for a sufficient time to decompose said organo-metallic compound and form a complex thereof with the asphaltene, admixing said complex with said charge stock and reacting the resulting colloidal suspension with hydrogen at a temperature above about 225° C. and under a pressure greater than 500 pounds per square inch gauge.

2. The process of claim 1 further characterized in that said organo-metallic compound comprises a carbonyl.

3. The process of claim 1 further characterized in that said organo-metallic compound comprises a beta-diketone complex.

4. The process of claim 1 further characterized in that said organo-metallic compound comprises a heteropoly acid.

5. The process of claim 1 further characterized in that said colloidal suspension is reacted with hydrogen at a temperature within the range of about 225° C. to about 500° C. and under a pressure of from about 500 to about 5000 pounds per square inch gauge.

6. A process for hydrorefining a hydrocarbon charge stock containing less than about 0.1% by weight of pentane-insoluble asphaltenes which comprises admixing phosphomolybdic acid with an asphaltene, heating the mixture at a temperature less than about 310° C., for a time sufficient to decompose the phosphomolybdic acid and form a complex thereof with said asphaltene, admixing said complex with said charge stock to form a colloidal suspension, and reacting said colloidal suspension with hydrogen at a temperature of from about 225° C. to about 500° C. and under a pressure of from about 500 to about 5000 pounds per square inch gauge.

7. The process of claim 6 further characterized in that said colloidal suspension is reacted with hydrogen in the presence of added hydrogen sulfide.

8. A process for hydrorefining a hydrocarbon charge stock containing less than about 0.1% by weight of pentane-insoluble asphaltenes which comprises admixing molybdenum hexacarbonyl with an asphaltene, heating the mixture at a temperature less than about 310° C., for a time sufficient to decompose the molybdenum hexacarbonyl and form a complex with said asphaltene, admixing said complex with said charge stock to form a colloidal suspension, and reacting said colloidal suspension with hydrogen at a temperature of from about 225° C. to about 500° C. and under a pressure of from about 500 to about 5000 pounds per square inch gauge.

9. A process for hydrorefining a hydrocarbon charge stock containing less than about 0.1% by weight of pentane-insoluble asphaltenes which comprises admixing molybdyl acetylacetonate with an asphaltene, heating the mixture at a temperature less than about 310° C., for a time sufficient to decompose the molybdyl acetylacetonate and form a complex with said asphaltene, admixing the resulting complex with said charge stock to form a colloidal suspension, and reacting said colloidal suspension with hydrogen at a temperature of from about 225° C. to about 500° C. and under a pressure of from about 500 to about 5000 pounds per square inch gauge.

10. A process for hydrorefining a hydrocarbon charge stock containing less than about 0.1% by weight of pentane-insoluble asphaltenes which comprises admixing molybdenum blue with an asphaltene, heating the mixture at a temperature less than about 310° C., for a time sufficient to decompose the molybdenum blue and form a complex with said asphaltene, admixing said complex with said charge stock to form a colloidal suspension, and reacting said colloidal suspension with hydrogen at a temperature of from about 225° C. to about 500° C. and under a pressure of from about 500 to about 5000 pounds per square inch gauge.

References Cited by the Examiner

UNITED STATES PATENTS

| | | | |
|---|---|---|---|
| 2,999,075 | 9/1961 | Pruett | 252—472 |
| 3,053,756 | 9/1962 | Nottes et al. | 208—189 |
| 3,161,585 | 12/1964 | Gleim et al. | 208—264 |

DELBERT E. GANTZ, *Primary Examiner.*

ALPHONSO D. SULLIVAN, *Examiner.*